Feb. 2, 1932.    P. GANGLER    1,843,449
MACHINE FOR CLOSING FILLED BAGS
Filed May 19, 1931    11 Sheets-Sheet 5

Paul Gangler
INVENTOR;
his Attorney.

Feb. 2, 1932.  P. GANGLER  1,843,449
MACHINE FOR CLOSING FILLED BAGS
Filed May 19, 1931  11 Sheets-Sheet 6

Paul Gangler
INVENTOR
his Attorney

Feb. 2, 1932.     P. GANGLER     1,843,449
MACHINE FOR CLOSING FILLED BAGS
Filed May 19, 1931     11 Sheets-Sheet 8

Paul Gangler
INVENTOR

Patented Feb. 2, 1932

1,843,449

UNITED STATES PATENT OFFICE

PAUL GANGLER, OF ESSLINGEN, GERMANY, ASSIGNOR TO THE FIRM FR. HESSER, MASCHINENFABRIK-AKTIENGESELLSCHAFT, OF STUTTGART-CANNSTATT, GERMANY

MACHINE FOR CLOSING FILLED BAGS

Application filed May 19, 1931, Serial No. 538,421, and in Germany April 29, 1931.

My invention relates to improvements in the machine for closing bags, forming the subject matter of my pending application for patent, Serial Number 518,161, filed in the United States Patent Office on the 25th day of February 1931. In this machine the closing of the filled bag, which may consist of a single or a plurality of envelopes, is effected in such a manner that a strip or ribbon of a suitable flexible material is secured to a flap of the empty end of the bag projecting beyond the contents of the bag parallel to the upper edge of said flap, in such a manner that the strip extends at both ends beyond the flap, the empty end of the bag being then flattened down and rolled up, whereupon the projecting ends of the flexible strip are bent down upon the folded portion of the bag.

One object of my present invention is to provide a mechanism for folding the projecting empty end of the bag, which produces a sharp and neat folding in reliable manner.

A further object of my invention is to provide an improved mechanism to effect the bending down of the projecting ends of the said flexible strip after the rolling up of the empty portion of the bag.

Further improvements will be pointed out as my specification proceeds of the machine illustrated by way of example in the drawings affixed hereto, as far as necessary for understanding my improvements.

In the drawings is:—

Figs. 9 and 10 show folding members of Figs. 6 and 7 in horizontal section in two different positions, Fig. 13, is a side-elevation of the mechanism for rolling up the pressed end of the bag.

As already pointed out only those parts of the machine of my pending application Serial No. 518,161 are illustrated in the appended drawings and described in this specification, which form the object of the present application or a requisite for facilitating the understanding of my present invention. Regarding the remaining constructions and mode of operation of the machine reference should be had to the specification and drawings of said pending application Serial No. 518,161.

The drive of the machine is effected by the main shaft 1 which is continuously rotated in suitable manner, for instance by a pulley 603 and belt 614, from an electric motor 760. On the driving shaft 1 is keyed the spur wheel 605 meshing with the spur wheel 606 mounted upon the shaft 604. The rotation of this shaft is, as described and shown in my prior application Serial No. 518,161, transmitted to a transverse shaft by means of a pair of bevel wheels and from this shaft by a pair of bevel wheels to the shaft 610. From the shaft 604 is driven the shaft 613 through the bevel wheels 611 and 612. On the shafts 604, 610 and 613 are keyed the peripheral and cylindrical grooved cams hereafter described and forming part of my improved machine.

Figure 5:
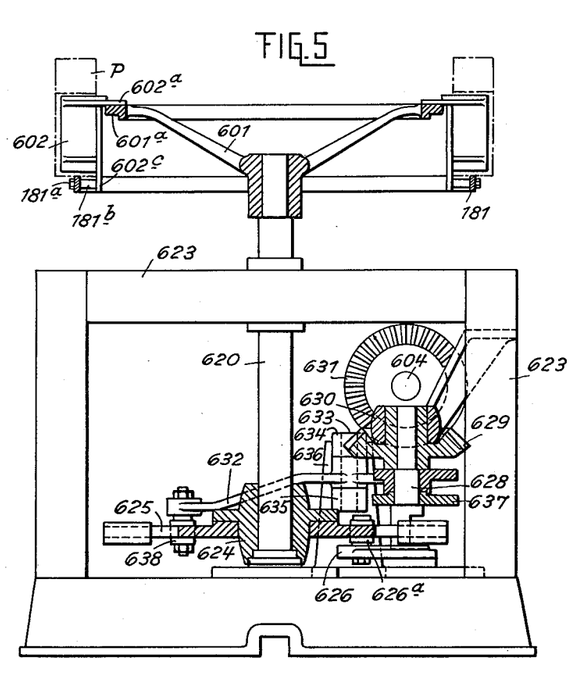

The feeding device of the machine consists in the embodiment of my invention illustrated of a stepwise or intermittently rotated wheel 601, particularly clearly shown in Fig. 5 of the drawings, which is provided with a suitable number of receptacles or pockets for containing the bags P. The feed receptacles have the shape of a pocket 602 enclosed at three sides, which is open towards the outside and by means of flanges 602ª mounted on the rim 601ª of the wheel 601. Below the wheel are located the packages in the receptacles 602 on a hoop-shaped rail 181, which by means of bolts 181ª and spacing bushings 181ᵇ is secured to the downward projecting extensions 602ᶜ of the receptacle rear walls. The feed wheel 601 is keyed to the shaft 620 adapted to revolve in suitable bearings of the machine framing 623. At the lower end of this shaft 620 is by means of the hub 624 mounted the Maltese wheel 625 adapted to be operated by means of a crank 626. This crank is mounted upon the shaft 628 which at its upper end carries the bevel wheel 629 whose hub is able to rotate freely in the bearing 630. This bevel wheel 629 meshes with a bevel wheel 631 upon the shaft 604. The crank 626 engages during its rotation with its anti-friction bowl 626ª in succession the radial recesses or slots 625ª of the feed wheel 625 and thus turns it intermittently, in a manner well known in the art. After each angular movement the Maltese wheel 625 is arrested in its position by a stop lever 632 pivotally mounted upon the pin 633 adapted to rotate in the eyes 634 and 635 of a suitable pedestal. One end of the stop lever designed as bell-crank lever runs in well known manner with two bowls in the grooved cam 637 mounted upon the shaft 628. After the completion of each advance of the Maltese wheel the arresting lever 632 engages with its bowl 638 the slot 625ª of the Maltese wheel 625 facing the said bowl.

Figure 1:
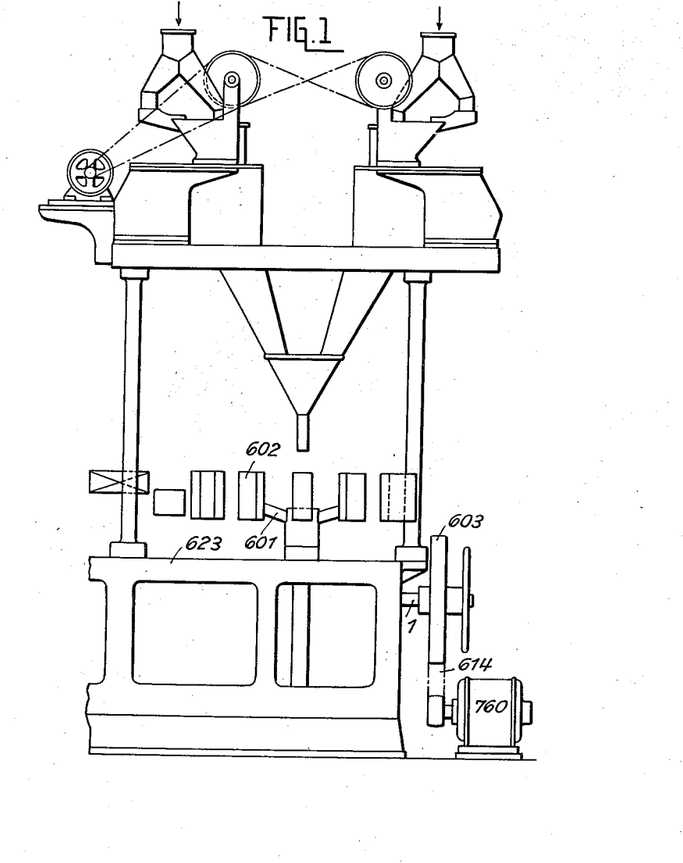
Fig. 1, a diagrammatic side elevation of that portion of the machine which forms the object of my pending application Serial No. 518,161, to which relate the improvements of my present application, Fig. 2, a likewise diagrammatic plan of this portion of the machine, some parts being omitted for the sake of clearness, Fig. 3, a total view in plan of those driving shafts with cams to which my invention relates, Fig. 4, a plan on those working stations of the closing mechanism of the machine, to which my present improvements extend, on a larger scale, Fig. 5, the feeding mechanism of the machine with its driving gear in side elevation and partial cross-section, on a larger scale, Fig. 6, a side-elevation of the mechanism for flattening down the projecting empty end of the bag, Fig. 7, a front-elevation of this mechanism, Fig. 8, a side elevation of the folding members shown in Fig. 7 in the operative position.
Figure 2:
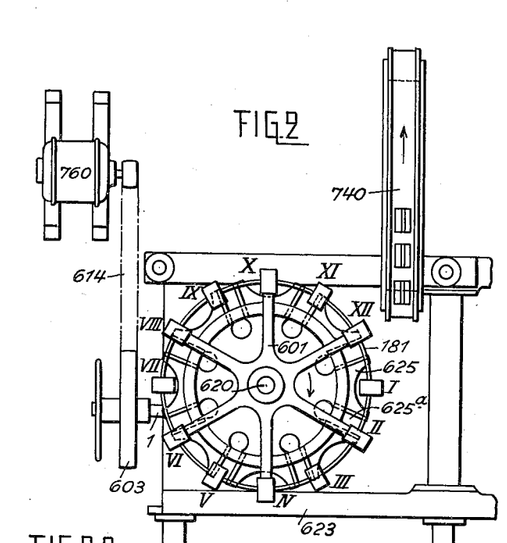
Figure 28:
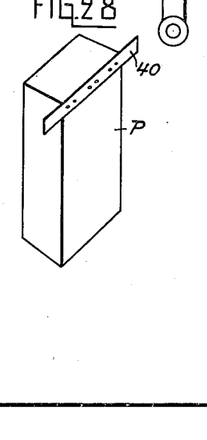
Figs. 28 to 32, illustrate the successive stages of the process for closing the bag.

The bag is at working station I, Fig. 2, in suitable manner introduced into a receptacle 602 of the feed wheel 601 and in succession conveyed to the stations II, III, IV ... by the rotating feed wheel. At station II a strip 40 of sheet metal or other suitable flexible material is attached to the upper edge of one side of the package, Fig. 28 of the drawings. A mechanism for effecting this is fully described and illustrated in my copending application Serial No. 518,161. The mode of attaching the strip and the mechanism for effecting this does, however, not form part of my present invention and, for this reason, has been omitted in the specification and drawings. At station IV the bag is filled in a suitable manner. The filling process and the mechanism employed for the purpose may likewise be carried out as described and illustrated in my prior application Serial No. 518,161. They do not form part of my present invention and have therefore been omitted from the specification and drawings. My present invention starts with an already filled bag provided with the strip 40, and consists of an improvement of the mechanism serving for the closing or sealing of such a bag as specified in my prior application Serial No. 518,161.

It is assumed that as in my prior application the bag which has arrived at station VII is filled and provided with the flexible strip 40 for sealing the package.

After the package has arrived at station VII, the portion of the package extending beyond the filling is folded or tucked in at two opposite sides and simultaneously pressed flat at the two other sides. In the present case the mechanism illustrated in Figs. 4 and 6 to 10 is made use of for this purpose. This mechanism comprises as in my prior application Serial No. 518,161, a pair of folding or creasing knives 200 and 201 adapted to oscillate or reciprocate from outside towards the inside of the bag. These folding knives are, however, provided with triangular or plough-share like folding plates 200′ and 201″, for the purpose described lower down. The folding knives are at their upper ends bent off under an angle and are attached to the forked levers 202, 203, 204 and 205, which in their turn are pivotally mounted in the bearing block 206 by means of pins 202′, 203′, 204′ and 205′. The bearing 206 is mounted upon a pillar 206ᵇ on the machine framing by means of the bracket 206ª. The said levers 202 to 205 operate in the manner of a parallel guide. Upon the pins 203′ and 204′ are secured levers with toothed sectors 207 and 207′ in gear with each other. Upon the pin 204′ there is also mounted a driving crank 208 to which is hinged a connecting rod 209 which at its other end is pivotally mounted upon the cam lever 210. This cam lever 210 is adapted to rotate upon the pin 211 fixed in the eye 212. The cam bowl 212′ located at the other end of the cam lever 210 is controlled by the cam 213, Fig. 3, keyed to the shaft 613.

Figure 3:
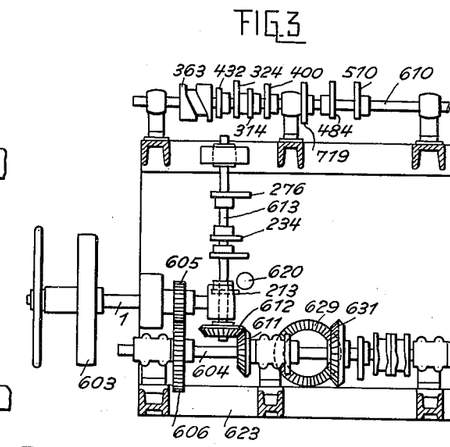
Figure 29:
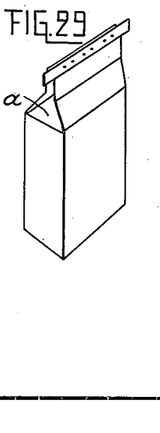

At right angles to the folding knives 200 and 201 there are provided plates 215ª and 216ª adapted to swing inwards. These plates are mounted upon the carrier members 217, 218 and these are in their turn secured to the pairs of levers 219, 220, 221 and 222. At the upper end, the said pairs of levers are pivotally mounted in the bearing 225 secured to the arm 206ᵃ. The pairs of levers 220, 221 are in engagement with each other by toothed sectors 226 mounted on their pivot pins. A driving crank 230 is pivoted to the connecting rod 231 the lower end of which is hinged to the cam lever 232, Fig. 4. This lever is adapted to rock upon the pin 211 and carries the anti-friction bowl 233 which is operated by the cam 234, Fig. 3, keyed to the shaft 613. Laterally and outside of the plates 215ᵃ and 216ᵃ there are provided wires 215 and 216 bent into bows, the legs of which are adjustably mounted in the outer bored ends of the pivot pins 220ᵃ, 220ᵇ, 221ᵃ, 221ᵇ of the jointed levers 220 and 221, by means of screws 220ᶜ and 221ᶜ. When the bag has arrived at station VII, it is lifted into the operating range of the folding mechanism. This is effected by a lifting device designed in a similar manner to the lifting device 315, 316 shown in Fig. 13 of the drawings and described further on. During the lifting of the bag the members of the mechanism take up the position shown in Figs. 6 and 7, the ends of the respective sides of the bag being then able to enter into the spaces between the wire bows 215 and 216 and the plates 215ᵃ and 216ᵃ. The folding knives 200, 201 are now moved inwards and fold or crease the adjacent ends of the bags. The triangular folding extensions 200′ and 201′, particularly clearly shown in Figs. 10 and 29, then effect a sharp and neat creasing of the portions of the closing flaps not reached by the knives, see Fig. 29.

Figures 6, 7, 8, 9, 10:
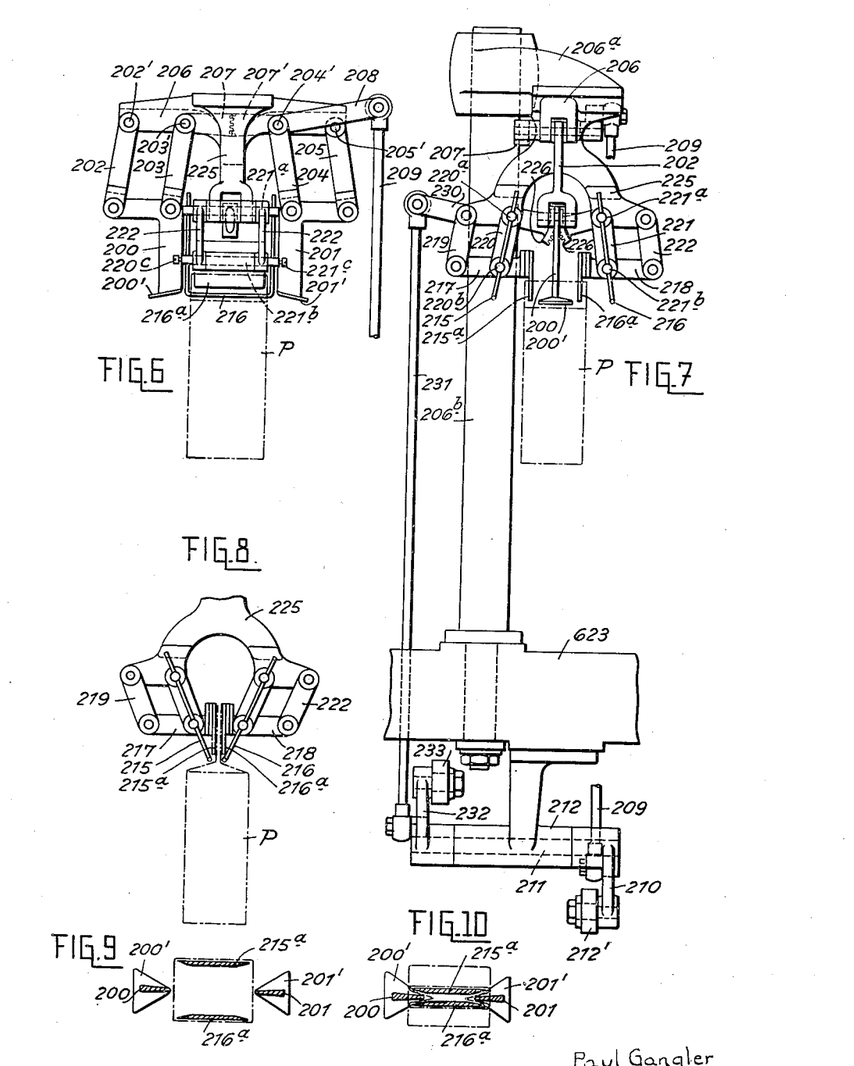

Simultaneously the wire bows 215 and 216 are also moved inwards, as shown in Fig. 8, whereby the contacting walls of the bag are forced inwards against the folding knives 200, 201 and firmly pressed against the folding knives and creased. By the cooperation of the folding knives with the inner plates 215ᵃ and 216ᵃ sharp and neat creases are also obtained at the outer edges of the folding flaps. The folding knives 200, 201 then swing outward again, and the folding plates 215ᵃ, 216ᵃ exert still further pressure upon the folded portion of the bag.

The station VIII remains unoccupied.

Figure 4:
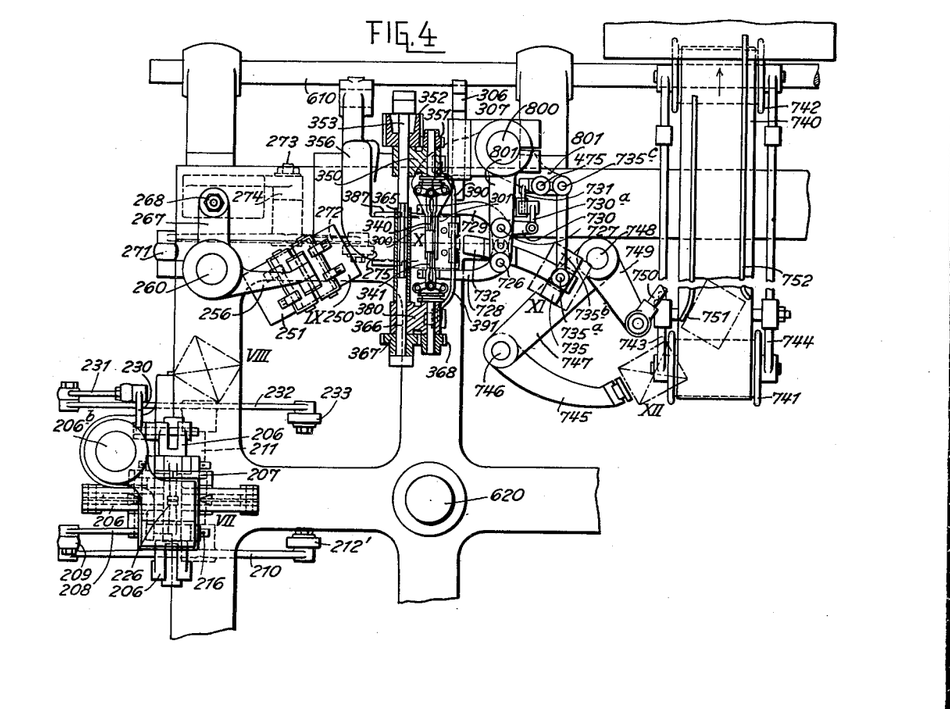
Figure 11:
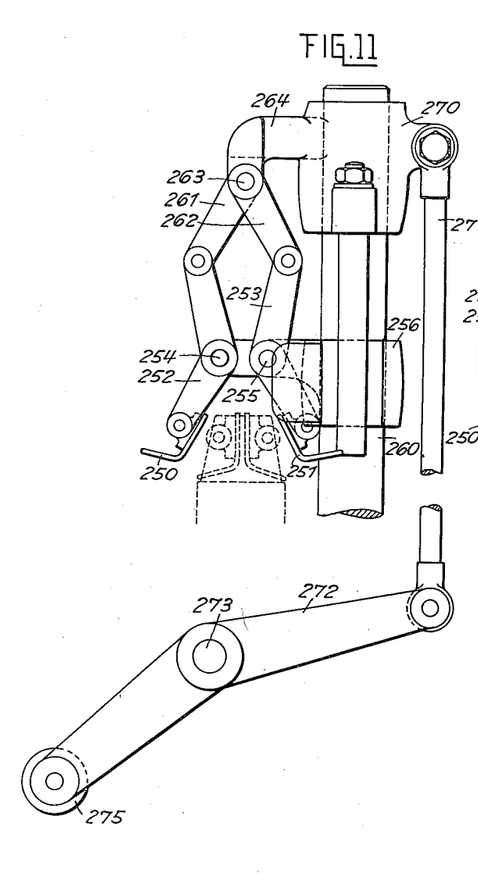
Figs. 11 and 12 show in side-elevation and front-elevation the mechanism for repressing the folded down upper empty end of the bag.
Figure 12:
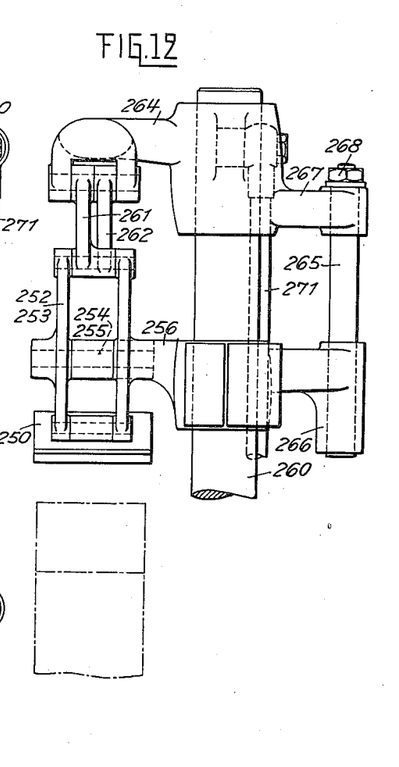

At station IX, Figs. 4, 11 and 12 takes place a repressing of the prefolded portion of the package projecting beyond the filling of the bag. This mechanism comprises, similar to my copending application Serial No. 518,161, two angularly bent-off pressing jaws 250 and 251 which are pivotally mounted in the pairs of twin levers 252, 253. These levers turn around or rock upon pins 254 and 255 secured to the bearing arm 256 clamped to the pillar 260. The upper ends of the pairs of levers 252, 253 are hinged to the levers 261, 262. The latter levers are freely rotatable mounted upon the pin 263 fixed on the bearing 264. The bearing 264 is able to slide freely upon the pillar 260 and secured against turning by a guide pin 265 adapted to reciprocate in a guide sleeve 266 of the bearing 256 clamped to the pillar 260. On the bearing 264 is cast the eye 267 through which the bolt 265 projects with its upper end and is there provided with a nut 268.

A further eye 270 cast on the bearing 264 is pivotally connected with a pull rod 271 which is joined to the cam lever 272 adapted to rock upon the pin 273. The pin 273 is screwed into the bearing bracket 274. The cam bowl 275 journaled at the other end of the cam lever 272 rests upon the cam 276 keyed to the shaft 613. By means of the said double and connecting levers a toggle joint is provided so that when the connecting rod 271 is moved downwards the joint is spread apart at its upper end and the lower portion with the press jaws 250 and 251 is forced together.

The easily movable jaws 250, 251 adapt themselves closely to the folded portions of the package and exert a powerful pressure upon the folded down part.

After the package has arrived at the station X the flattened down portion of the package is folded up. This may be effected in any suitable manner, for instance by forming a plurality of tucks. In the present case this is effected by rolling up the folded down portion of the bag, as in my copending application Serial No. 518,161, for which purpose may be employed the twisting mechanism shown in Figs. 4, 13, 14 and 15 of the drawings affixed to my specification.

Figures 13, 19:
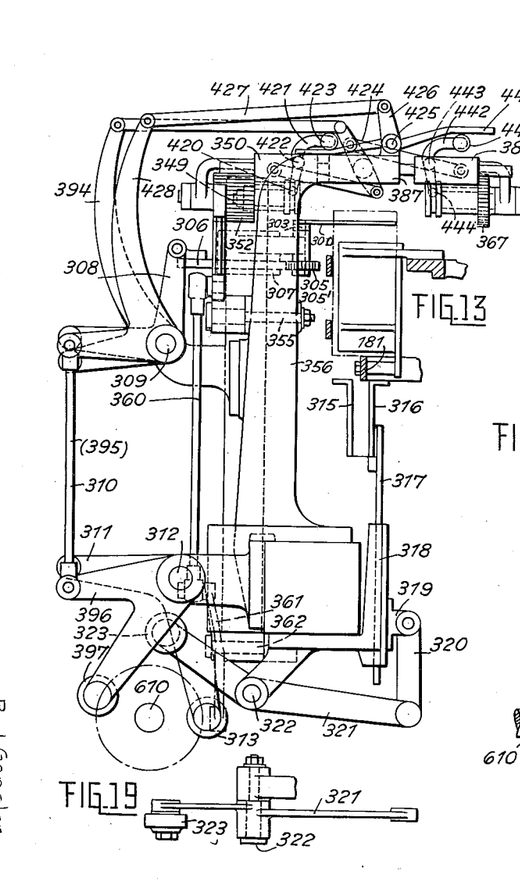
Figure 14:
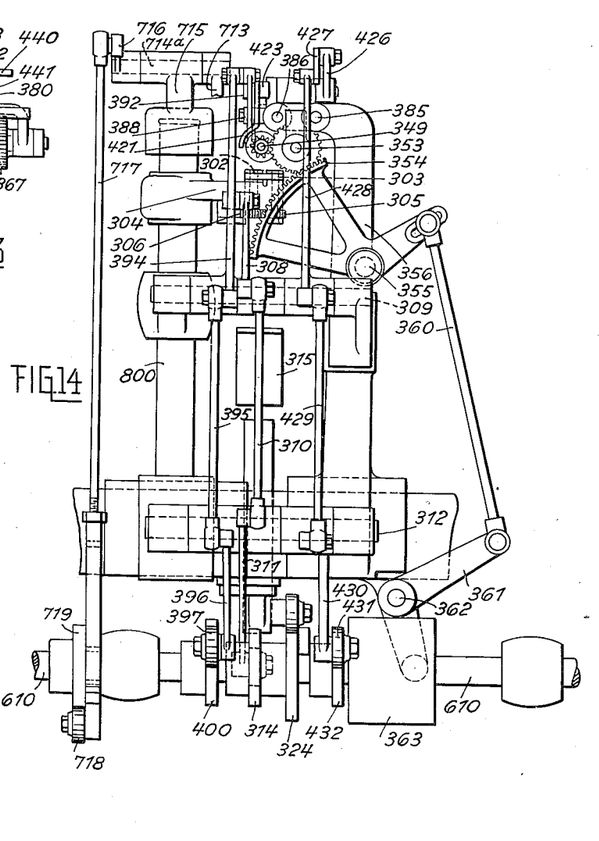
Fig. 14 is a front elevation of Fig. 13.
Figure 15:
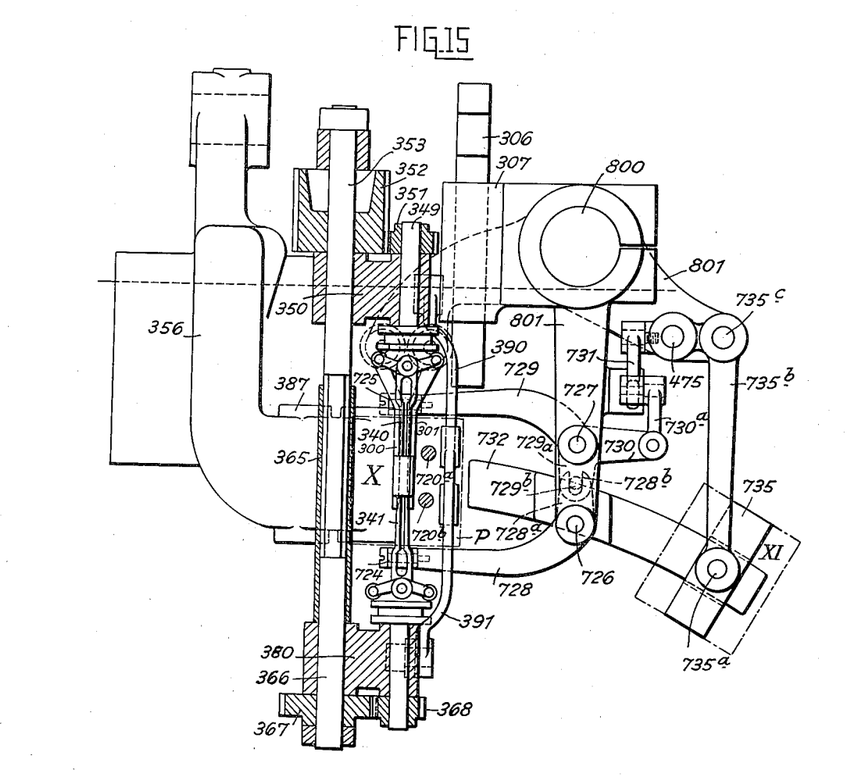
Fig. 15 represents a portion of Fig. 13 in elevation on a larger scale, Figs. 15ª, 16 to 22 show details of the mechanism according to Figs. 13 to 15.

This mechanism comprises the auxiliary or aligning tongs consisting of the two legs 300, 301. These are pivotally mounted upon the pins 302, 303 adapted to rotate in the bearing 304. The pins 302, 303 carry at their lower end spur wheels 305, 305′ in engagement with each other, and of which the wheel 305 is adapted to be rotated by a rack 306. The rack is slidable in a guide 307 and is joined to a bell-crank lever 308 adapted to rock upon the shaft 309 and at its lower end hinged to a connecting rod 310 connected to the cam lever 311 oscillating upon the shaft 312. An anti-friction bowl 313 mounted upon this lever contacts with the cam 314 keyed to the shaft 610.

Underneath the carrier rail 181 for the package there is located a lifting device consisting of the two angle members 315 and 316 secured at their lower end to a guide rail 317. The guide rail slides in the guide 318 and carries at its lower end an eye 319 in which a connecting rod 320 is arranged joined at its other end to the cam lever 321. The cam lever 321, Fig. 19, swings upon the pin 322 and is provided with a cam bowl 323 adapted to cooperate with the cam 324 mounted upon the shaft 610.

Figure 16:
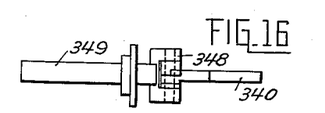
Figure 17:
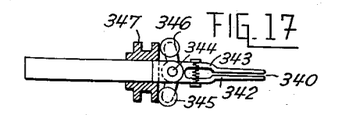
Figure 18:
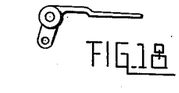

Above the auxiliary tongs 300, 301 the rolling tongs 340 and 341 are mounted opposite each other in such a manner that they are capable of being advanced inwards from an outer non-operative position, not shown in the drawings, around the flattened down end portion of the bag. Each tong consists according to Figs. 16–17 of the legs 342 and 343, which are able to swing around the common pivot pin 344. The legs of the tongs are designed as double-armed levers which at the opposite end are provided with bowls 345 and 346 engaging a sleeve with annular groove 347. The pin 344 rests in a bifurcated bearing 348 rigidly mounted on the spindle 349 of the tongs. On this spindle 349 is keyed a spur wheel 351, Fig. 15, which meshes with a spur wheel 352. This wheel is secured to the shaft 353 rotatable in the bearing 350. With the spur wheel 352 engages a toothed sector lever 354, Fig. 14, adapted to rock upon the stationary pin 355 screwed into the bearing pedestal 356.

Figure 15A:
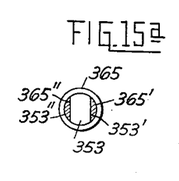

At the other end of the toothed sector lever is secured a connecting rod 360 pivotally attached to the cam lever 361 adapted to rock upon the pin 362 and operated through a cam bowl from a cylindrical cam 363 keyed to the shaft 610. The other tong 341 is identical with the just described one, as far as the design and its drive is concerned. Its drive is effected from the shaft 353 through the tube 365 telescopically slidable upon the shaft and the pin 366 fixed in this tube. To this pin is keyed the spur wheel 367 which is in gear with the spur wheel 368 mounted upon the spindle of the tongs. As the tongs move from outside towards the inside and must be withdrawn again from the rolled up portion of the package, the transmission shafts 353, 365 and 366 are adapted to slide within one another. The shaft 353 is provided with two diametrically flat surfaces 353′ and 353″, Fig. 15ª. The tube 365 is provided with correspondingly shaped counter faces 365′ and 365″ so that rotary motion is ensured in spite of the relative axial displacement of the shafts.

Figures 20, 21, 22, 24:
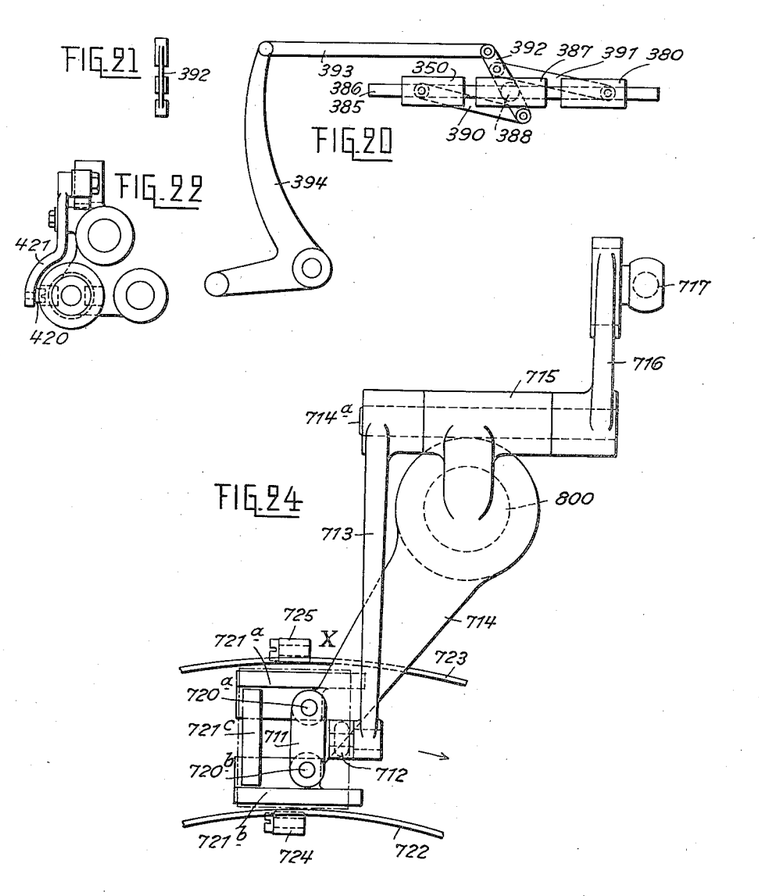

For the mutual displacement of the tongs the bearings 350 and 380 are according to Fig. 20 provided with bolts 385 and 386, which are firmly secured in the bearing 387. The bearing 387 is fixed to the bearing bracket 356. The bearings 350 and 380 carry rods 390 and 391 secured to a lever 392, which is pivotally mounted upon the stationary bearings at 388. To the lever 392 is joined a connecting rod 393 which is hinged to the bell-crank lever 394. The other end of this bell-crank lever 394 is connected to the rod 395, Fig. 14, and the cam lever 396 upon which is mounted the bowl 397 adapted to cooperate with the cam 400 keyed to the shaft 610.

The opening and closing of the tongs is effected by the following mechanism:

The grooved sleeve 347 is engaged by a sliding pin 420, Figs. 13, 14 and 22, mounted on the cranked lever 421 adapted to rock upon the bearing 350 at 422. At the other end of this lever is secured a bowl 423 which rests upon the switch tong 424 which is adapted to swing around the pivot pin 425 at the stationary bearing 387. Upon the pin 425 is secured a crank 426 to which is hinged a rod 427 which at the other end engages the bell-crank lever 428 adapted to rock upon the shaft 309. The free end of this bell-crank lever carries a connecting rod 429 engaging a cam-lever 430 provided with a bowl 431 and adapted to be actuated by the cam 432 keyed to the shaft 610. Upon the pin 425 is mounted a second switch tong 440 against which abuts the bowl 441 of the cranked lever 442 adapted to rock upon the pivot pin 443 at the movable bearing 380 and to engage the groove of the sleeve of the other tongs by means of a pin 444.

Figures 30, 31:
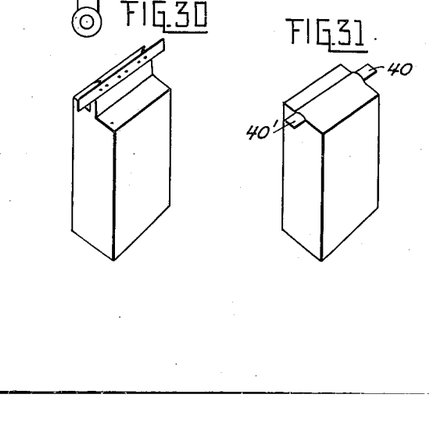

This mechanism functions as follows:

After arrival of the package at station X, the package is lifted off the guide rail 181 by the lifting device 315, 316 and 317 and brought to such a level that the twist tongs 340, 341 are in alignment with the upper edge of the package, the flattened portion of the bag entering between the legs of the spread apart auxiliary tongs 300, 301. These tongs are closed simultaneously with the lifting of the package and bring the folded up end portion into accurate alignment so that now the opposite edges of the portion of the bag to be folded are absolutely parallel. In Fig. 15 of the drawings the rolling-up tongs 340, 341 are shown in their inner closed position so that they embrace the upper edge of the package with the affixed metal strip 40. The auxiliary tongs 300, 301 are then opened again. Then the toothed sector lever 354 is set in motion and the rolling-up motion carried out through the spur wheels 352, 353 and 367 and 368, as shown in Fig. 31. Inasmuch as the distance between the filling level and the upper edge of the package is reduced hereby the package is moved upwards towards the rolling-up tongs by the lifting mechanism described before. After the rolling-up is finished the folding tongs are withdrawn from the bag by the switches 424 and 440 being swung around the pivot pin 425 by their operating mechanism described, so that the switch 424 raises the bowl 423 and the switch 440 lowers the bowl 441. The two levers 421 and 442 are also rocked thereby so that the grooved sleeves of the tongs are moved inwards. These sleeves press upon the bowls 345, 346 and consequently also in the same form upon the inner tongs so that the legs of the tongs are slightly opened. Directly after this procedure the bearings 350 and 380 in which the rolling-up tongs are journaled are displaced outwards so that thus the slightly opened tongs may be withdrawn from the rolled-up portion of the bag. Then the toothed quadrant lever 354 is turned in the reverse direction until it attains its initial position. Then the two bearings 350, 380 of the tongs are again moved inwards and the switches 424 and 440 raise or depress the bowls or rollers 423 and 441 a little more, so that the tongs are thereby opened out again and are ready for rolling up the next package arriving.

Figure 23:
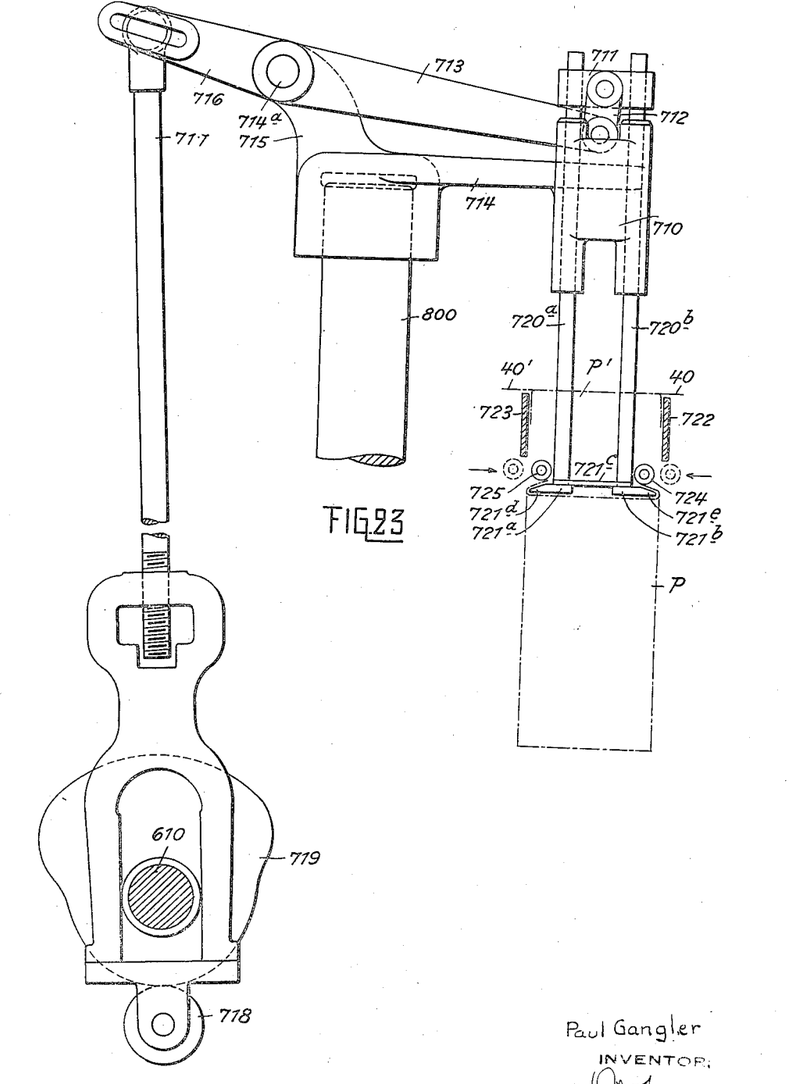
Fig. 23 is a side-elevation of the mechanism for bending down the projecting ends of the flexible strip, Fig. 24, a plan of Fig. 23, Fig. 25, a side-elevation of the driving mechanism for the bending rollers of Fig. 23, Fig. 26, a side-elevation of a mechanism for repressing the seal.

As soon as the tongs are opened takes place the bending over of the laterally projecting ends 40, 40', Fig. 31, of the strip. This is effected by the press member or die, shown in Figs. 23 and 24, in conjunction with two rails 722 and 723 located at the side of the feed track. The die consists of two strips 721$^a$ and 721$^b$ connected with each other by a transverse member 721$^c$ and bevelled at their outer edges 721$^d$ and 721$^e$ so as to form a knife edge or wedge. The die is secured to two rods 720$^a$, 720$^b$ vertically slidable guided in a head piece 710. The head piece 710 is mounted upon an arm 714 secured to a pillar 800 fixed upon the machine plate. The rods 720$^a$, 720$^b$ are at their upper ends connected by a transverse member 711, at which by means of a joint 712 engages a lever 713 pivotally mounted on a pin 714$^a$ located in the bearing 715 of the pedestal 714. At the other end of the pin 714$^a$ is mounted a lever 716 to which is pivoted a rod 717 which at the lower end carries a cam bowl 718. This bowl is kept in constant engagement with the cam 719 upon the shaft 610 by a spring not shown in the drawings.

During the rolling up or curling of the bag the die is in its upper position not shown in the drawings. As soon as the rolling-up is completed, the die is moved in the lower position, shown in Fig. 23, and pushes the package P from the upper position indicated by P' in Fig. 23 into its lower position upon the hoop-shaped rail, 181, the cooperation of the die strips 721$^a$, 721$^b$, with the side rails 722, 723 bending the lateral extensions 40, 40' of the metal strip vertically upwards.

Figure 25:
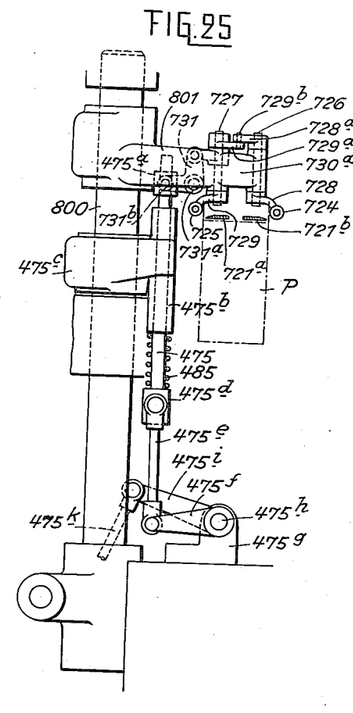
Figure 32:
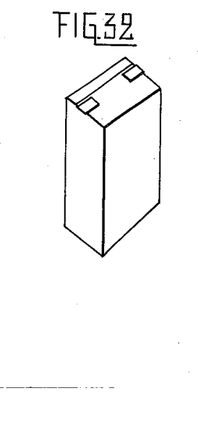

As soon as the package P has attained its lowest position, the ends 40, 40' of the strip are according to Fig. 32 bent inwards around the bevelled wedge-shaped or knife edges 721$^d$, 721$^e$. This is in the present case effected by the rollers 724 and 725 which, as shown in Figs. 15 and 25, are rotatably mounted on levers 728 and 729. The levers are mounted at the lower ends of pins 726, 727 adapted to rotate in bearings of an arm 801 mounted upon the pillar 800. At the upper ends of the pins 726 and 727 there are mounted arms 728$^a$ and 729$^a$ which are coupled together by slot 728$^b$ and pin 729$^b$. The second arm 730 of the angular lever 729$^a$ is engaged by a bell-crank lever 731 by means of a pivoted crank 730$^a$. The lever 731 is pivoted upon the carrier arm 801 and 731$^a$ and engages at 731$^b$ a block 475$^a$ mounted upon a rod 475. The rod 475 is vertically guided in the bearing sleeve 475$^b$ of an arm 475$^c$ mounted on the pillar 800. At the lower end of the rod 475 is fixed a block 475$^d$ engaged by an arm 475$^f$ by means of a joint 475$^e$. The arm is fixed upon one end of a pin 475$^h$ journaled in a pedestal 475$^g$, upon the other end of which is secured a lever 475$^i$. The latter lever is engaged by cam rod 475$^k$ which cooperates with the cam 484 mounted on the shaft 610. Between the block 475$^d$ and the bearing sleeve 475$^b$ there is provided a compression spring 485 by which the cam bowl provided upon the lower end of the cam rod 475$^k$ is permanently kept in contact with the surface of the cam 484. As soon as the package has attained the bottom position, the arms 728 and 729 are by means of the mechanism described moved from their inoperative outer position shown in Fig. 15 inwards and thus also the rollers 724, 725 moved inwards from their outer position shown in broken lines in Fig. 23, and turn the upright ends 40, 40' of the metal strip around the edges 721$^d$, 721$^e$.

Figure 26:
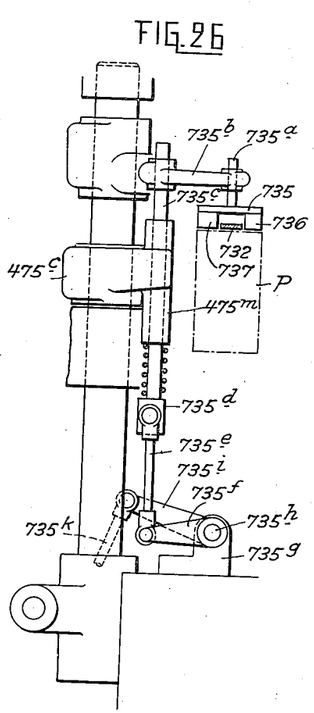
Figure 27:
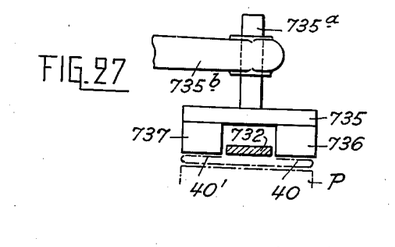
Fig. 27 shows a portion of Fig. 26 on a larger scale.

During the next advance of the package the rollers 724 and 725 are withdrawn again, but the die guides 721$^a$, 721$^b$ remain in their lower position until the package passes underneath a central guide rail 732, Figs. 15 and 26, and is kept by it in the closed or sealed position. The rail 732 extends up to the station XI at which the bent-over ends 40, 40' are turned over completely and are strongly forced against the seal. For this purpose there is above the station XI provided a plunger 735, Figs. 15, 26 and 27 adapted to be reciprocated vertically, which at both sides of the stationary guide rails 732, is provided with press blocks 736, 737 and by means of a rod 735$^a$ secured to an arm 735$^b$. This arm is mounted at the upper end of a rod 735$^c$ adapted to slide vertically in a second guide bushing 475$^m$ of the arm 475$^c$. A block 755$^d$ mounted at the lower end of the rod 735$^c$ is through a joint 735$^e$ engaged by a lever 735$^f$ pivoted upon a pin 735$^h$ rotatably journaled in a pedestal 735$^g$. On the other end of the pin is mounted a lever 735$^i$, which is engaged by a cam lever 735$^k$, which is operated by the cam 510 keyed to the shaft 610.

At the next station XII takes place the ejection or discharge of the completely closed package from the conveyor or feed wheel on to a discharge or delivery belt 740, as in my copending application Serial No. 518,161. The delivery mechanism consists of the arm 745, which is pivoted to the joint 747 at 746. This joint is mounted upon the pin 748 upon which there is also fixed the arm 749. This arm is engaged by a rod 750 which is in well known manner operated by a suitable cam mechanism in such a way that the package is conveyed out of the feed receptacle at station XII on to the belt 740 and passes between two lateral guide rails 751 and 752. The belt or apron 740 runs around the rollers 741 and 742 journaled at the side frames 743 and 744 of the machine. A special pressing down device for the seal of the package is unnecessary in the hereindescribed embodiment of my invention.

It will be readily understood that structural modifications and changes may be made in the mechanism described and illustrated without departing from the spirit of my invention or the ambit of the appended claims.

I claim as my invention:

1. In a machine for closing filled bags, which are provided with a metal strip projecting at both ends at the upper edge of a flap of the empty portion of the bag extending beyond the contents of the package, in combination, means for intermittently feeding the bag towards the various working stations, means for flattening down the flap provided with the metal strip and the opposite flap of the empty end portion of the bag, means for folding up said end portion, and means for bending the projecting ends of said strip down upon the folded up end portion, said means for flattening down the flaps comprising two knife-like creasing members which at their lower ends are provided with ploughshare-like extensions and adapted to tuck the two other flaps inwards, and means adapted to press the two first named flaps above said extensions against the knife-like folding members.

2. In a machine for closing filled bags, which are provided with a metal strip projecting at both ends at the upper edge of a flap of the empty portion of the bag extending beyond the contents of the package, in combination, means for intermittently feeding the bags towards the various working stations, means for flattening down the flap provided with the metal strip and the opposite flap of the empty end portion of the bag, means for folding up said end portion, and means for bending the projecting ends of the strip down upon the folded up end portion of the bag, said means for flattening down the two flaps comprising two knife-like folding members, which at their lower ends are provided with ploughshare-like extensions and adapted to tuck the two other flaps inwards, and bow-like folding members adapted to press the two first-named flaps above said extensions against the knife-like folding members.

3. In a machine for closing filled bags, which are provided with a metal strip projecting at both ends at the upper edge of a flap of the empty portion of the bag extending beyond the contents of the package, in combination, means for advancing the bags stepwise towards the working stations, means for flattening down the flap provided with the metal strip and the opposite flap of the empty end portion of the bag, means for folding up said end portion and means for bending the projecting ends of said strip down upon the folded up end portion, said means for flattening down the two flaps comprising two knife-like folding members, which at their lower ends are provided with ploughshare-like extensions and adapted to tuck the two other flaps inwards, and means adapted to fold the two first-named flaps against the knife-like folding members, said means consisting of folding plates so arranged as to press the creases formed by the folding knives against the folding knives, and bow-shaped folding members so arranged that they crease the two flaps located parallel to the folding knives above the ploughshare-like extensions of the knives against said knives.

4. In a machine for closing filled bags, which are provided with a metal strip projecting at both ends at the upper edge of a flap of the empty portion of the bag extending beyond the contents of the package, in combination, means for intermittently advancing the bags towards the working stations, means for flattening down the flap provided with the metal strip and the opposite flap of the empty end portion of the bag, means for folding up said end portion, and means for bending the projecting ends of the strip down upon the folded up end portion of the bag, said means comprising two walls spaced apart by the width of the bag and extending parallel to the feed track of the bags, and a die adapted and operated to move the bag downwards after the folding up of the empty end of the bag between the said side walls and thus to bend the projecting ends of the strip upwards.

5. In a machine for closing filled bags, which are provided with a metal strip projecting at both ends at the upper edge of a flap of the empty portion of the bag extending beyond the contents of the package, in combination, means for moving the bag intermittently forward to the working stations, means for flattening down the flap provided with the metal strip and the opposite flap of the empty end portion of the bag, means for folding up said end portions, and means for bending the projecting ends of the strip around the folded up end portion, the latter means comprising two walls spaced apart by the width of the bag and located parallel to the feed track of the bags, and a die adapted and operated to move the bag downwards after the folding of the empty portion of the bag between said side walls and thus to bend the projecting ends of the strip upwards, the edges of the die being beveled to form a knife edge, and means for folding the upwards bent projecting ends of the strip around the beveled edges of said die.

6. In a machine for closing filled bags, which are provided with a metal strip projecting at both ends at the upper edge of a flap of the empty portion of the bag extending beyond the contents, in combination, means for intermittently advancing the bags to the working stations, means for flattening down the flap provided with the metal strip and the opposite flap of the empty end portion of the bag, means for folding up said end portion, and means for bending the projecting ends of the strip around the folded up portion of the bag, the latter means comprising two walls spaced apart by the width of the bag and located parallel to the feed track, and a die with knife-like sharpened edges located opposite said walls adapted and operated to move the bag after the folding up of the projecting empty end portion downwards and thus to turn the projecting ends of the strip upwards, and rollers adapted to be moved from the side across the beveled edges of the die and thus to turn the ends of the strip previously bent upwards around said edges inwards.

7. In a machine for closing filled bags, which at the upper edge of a flap of the empty end of the bag extending beyond the contents of the package are provided with a metal strip projecting beyond the flap at both ends, in combination, means for conveying the bags step-by-step from one working station to the other, means for flattening down the flap provided with the metal strip as well as the opposite flap of the empty end portion, means for folding up said end portion, and means for bending the projecting ends of the strip around the folded up end portion of the bag, and means for pressing the bent down ends of said strip, consisting of a die arranged and operated to be from the top lowered on to the turned over ends of the strip and to press them against the folded up portion of the empty end of the bag and the contents of the package.

8. In a machine for closing filled bags, which at the upper edge of a flap of the empty end of the bag projecting beyond the contents of the package are provided with a metal strip projecting at both ends beyond the flap, in combination, means for advancing the bags intermittently to the various working stations, means for flattening down the flap provided with the metal strip and the opposite flap of the empty end portion of the bag, means for folding up said end portion, and means for bending the projecting ends of the strip around the folded up end portion, the latter means comprising at a working station two walls spaced apart by the width of a bag and located parallel to the feed track at both sides of the bag, and a die divided along the center line of the feed track adapted to move the bag downwards between the said side walls and thus to bend the projecting ends of the strip upwards, means for bending the upstanding ends of the strip around the edges of the die inwards, at the following working place a press plunger likewise divided along the center line of the feed track adapted to force the turned over ends of the strip and the folded down portion of the empty part of the bag on to the contents of the package, and a stationary rail extending from the first named working station to the second named working station and of less width than the central spaces in said divided dies and so located that it holds the folded up portion of the empty end of the bag downwards and pressed against the contents of the package.

In testimony whereof I have affixed my signature.

PAUL GANGLER.